United States Patent
Stein

[15] 3,656,106
[45] Apr. 11, 1972

[54] EVALUATION CIRCUIT FOR THE DETERMINATION OF INFORMATION SENSED FROM MATRIX MEMORIES

[72] Inventor: Karl-Ulrich Stein, Munich, Germany

[73] Assignee: Siemens Aktiengesellschaft, Berlin and Munich, Germany

[22] Filed: May 25, 1970

[21] Appl. No.: 41,144

[30] Foreign Application Priority Data

June 9, 1969 Germany ......................P 19 29 142.0

[52] U.S. Cl. ..........................340/146.1, 235/153, 307/235, 328/115, 328/120, 340/174 ED, 340/174 JC, 340/174 WA

[51] Int. Cl. .......................................H03k 5/18, G06k 5/00

[58] Field of Search ................340/146.1, 174 ED, 174 WA, 340/179 JC; 324/34 MC, 40; 328/115–117, 120; 235/153; 307/235

[56] References Cited

UNITED STATES PATENTS 2,694,146 11/1954 Fairstein..............................328/115

*Primary Examiner*—Malcolm A. Morrison
*Assistant Examiner*—R. Stephen Dildine, Jr.
*Attorney*—Hill, Sherman, Meroni, Gross & Simpson

[57] ABSTRACT

A circuit for evaluating the correctness of information content of signals sensed from a mass storage memory, such as a magnetic core or a magnetic thin film memory. A pair of threshold circuits, each having a different threshold, receive the sensed signal and a reading strobe-type signal, generally desired of the same magnitude of the sensed signal, and provide valid or fault indicating signals to a coupling circuit having a pair of output terminals, one of which is enabled to indicate information content and the other of which is enabled when the information content is in question.

2 Claims, 2 Drawing Figures

PATENTED APR 11 1972 3,656,106

INVENTOR
Karl-Ulrich Stein

BY Hill, Sherman, Meroni, Gross & Simpson ATTYS.

EVALUATION CIRCUIT FOR THE DETERMINATION OF INFORMATION SENSED FROM MATRIX MEMORIES

BACKGROUND OF THE INVENTION

1. Field of the Invention

This invention relates to an evaluation circuit for the determination of information sensed from matrix memories, which, at an instant determined by a pulse signal, senses the sensing signals, recognizes faulty sensing signals and, while using a redundant code, causes the correction of the information.

2. Description of the Prior Art

When matrix memories are operated to provide binary signals, the problem emerges to amplify the signals which come from the memory and which contain the information, and to identify them as either a binary "0" or a binary "1." As matrix memories, ring-core memories or magnetic-film memories may, for instance, be employed with the instant invention. The signals (sensing signals) which are sensed out of the memory are fed to an amplifier. Then the amplified signals are fed to an evaluating circuit which transforms the output signal of the sensing amplifier, occuring at a certain instant, into a binary signal which binary signal has a polarity depending on the sensed information. The evaluating circuit senses the sensing signal at the outlet of the sensing amplifier only at a certain instant which is given by a pulse signal (strobe type signal) which instant of time nearly coincides with the maximum amplitude of the sensing signal.

The evaluating circuit primarily comprises a threshold circuit with a given threshold. If the amplitude of the sensing signal lies above the threshold at the instant of sensing, one kind of information, for instance a binary "1," will be assigned to this sensing signal; if the amplitude of the sensing signal lies below the threshold, for instance, a binary "0" will be assigned to this sensing signal.

The greater the storage density of matrix memories, such as magnetic-film memories, the smaller becomes the sensing signals, so that the signals finally reach a limit which is determined by interfering signals or amplifier noise. Then the sensing signals of the above-described evaluating circuit cannot be assigned perfectly to the correct kind of information, from time to time. Such sensing signals which are not assignable any more by the evaluating circuit, will be designated as faulty sensing signals in the following description.

SUMMARY OF THE INVENTION

It is the primary object of this invention to provide evaluation circuit which recognizes the above-described faulty sensing signals, so that a correction is possible if a redundant code for the stored information is used.

For the solution of this task the evaluating circuit, according to this invention, comprises a pair of threshold circuits, each of which are provided having one signal input respectively for the sensing signals and one signal input respectively for the pulse signals connected with the other threshold circuit. The thresholds of the threshold circuits are established at different levels such that at the instant of sensing if the sensing signals lie either above or below the two thresholds in a fault-free case, depending on the kind of information, the threshold circuits emit the same signals; that if, at the instant of sensing, the sensing signals lie between the thresholds in a faulty case, the threshold circuits emit different signals; and that if the outputs of the threshold circuits lead to a coupling circuit, at one output of which a signal appears in the case of a fault, or at the other output of which a signal appears in a fault-free case corresponding to the sensed information.

The threshold circuit can be constructed according to prior art, and, for instance, AND gates might be used therefor. The same is also true for the coupling circuit.

BRIEF DESCRIPTION OF THE DRAWING

Other objects, features and advantages of the invention will be best understood from the following detailed description of an exemplary embodiment of the invention taken in conjunction with the accompanying drawing in which.

DESCRIPTION OF THE PREFERRED EMBODIMENT

Figure 1:
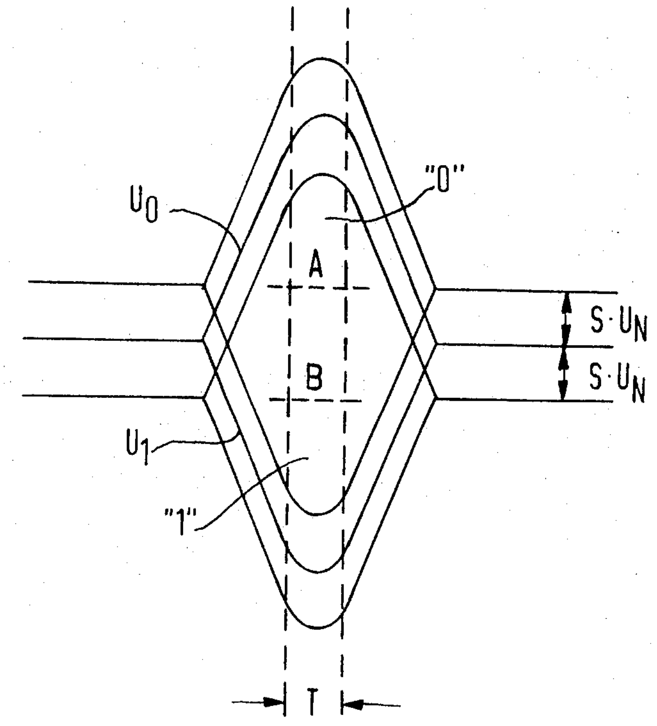
FIG. 1 illustrates several possible kinds of sensing signals, depending on the time, at the output of a memory sensing amplifier.

In FIG. 1, the sensing signal voltages are illustrated in an exaggerated form and in both the positive and the negative directions. They, as well as the fluctuations of the sensing line and the sensing amplifier, are regarded as voltages which may occur at the output of a sensing amplifier. The magnetic-film memory elements of the magnetic film memory, which is stated as an example, produce either a positive or a negative signal, depending on the stored information. In the most unfortunate case, the voltages $U_0$ and $U_1$ will appear at the output of the sensing amplifier, which voltages are illustrated in FIG. 1. These voltages have superimposed thereon noise voltages $U_N$ which are given by the equivalent mean square fluctuation $U_N{}^2 = u_N{}^2$ of the fluctuating outlet voltage $u_N$. The voltage $u_N$ exceeds the value $+S \cdot U_N$ with the probability of $$p = 1 - \phi(S)$$

where $S$ is a static safety factor (or is below the value $-S \cdot U_N$.) where $$\phi_S = 1/\sqrt{2\pi} \int_{-\infty}^{S} e^{-t^2/2}\, dt.$$

A threshold circuit with the threshold on the zero line of the voltages $U_O$, $U_1$ is now employed and if the term $S \cdot U_N$ is equal to the peak value of the sensing voltages $U_O$, $U_1$, then $p$ is the probability of faults during evaluation, which is caused by a false interpretation of the sensed information due to the covering fluctuation ( $> S \cdot U_N$ ).

This probability of faults can be lowered without an increase of the sensing voltages which requires disadvantageous measures with the storage matrix (lower storage density), by means of applying two threshold circuits according to the present invention. The thresholds of these threshold circuits are designated with A and B in FIG. 1 and are established at different levels.

If, within that period of time which is designated with T in FIG. 1, the sensing signals lie above or below the two thresholds with regards to their amplitude, the evaluating circuit can assign a definite kind of information to the sensing signal. If, however, the amplitudes of the sensing signals lie between the thresholds A and B, only one threshold circuit will emit a signal. The evaluating circuit recognizes this as a faulty case. If a redundant code is used for the stored information, for instance, if parity bits are added to each word, the information can be corrected. If, for instance, one parity bit is used, one mistake can be corrected. Besides the correction of statistically appearing faults, which has been treated hereinbefore, other faults are being corrected too which appear continuously spread out over the criterion described.

Figure 2:
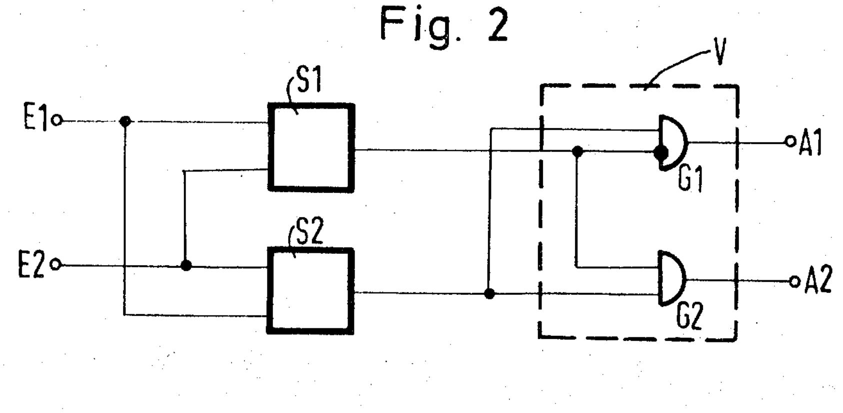
FIG. 2 illustrates an exemplary embodiment of the evaluating circuit of the present invention.

In FIG. 2 an exemplary embodiment of the evaluating circuit according to the present invention is illustrated. The evaluating circuit comprises a pair of threshold circuits S1 and S2 and a coupling circuit V, which coupling circuit is realized, in the sample embodiment by means of two gates G1 and G2. The threshold circuit S1 is designed to have the higher threshold (threshold A), the threshold circuit S2 is designed to have the lower threshold (threshold B). One input respectively of each threshold circuit S1, S2, is connected with each other to receive the pulse impulses supplied by a memory at the input E1; the same is true for the receipt of sensing signals at input E2.

The threshold circuits S1 and S2 can be realized by means of AND circuits. The outputs of the threshold circuits S1 and S2 are connected directly to one of the AND gates G2. The output of the threshold circuit S2 is connected directly with the other AND gate G1, and the output of the threshold circuit S1 is connected via a negation member connected with it to an input of AND gate G1. Then an impulse appears at the output A1 of the coupling circuit, if the sensing signal at the input E2 has been faulty; at the output A2 of the coupling circuit V the sensed information is provided for utilization.

Three cases have to be differentiated with the way of functioning of the evaluating circuit:

In the first case the sensing signal has, for instance, a positive amplitude. This would mean, according to FIG. 1, that a "0" has been sensed. If such a sensing signal is provided to the input E2, and if simultaneously a pulse impulse appears at E1, both threshold circuits S1 and S2 will react, since the sensing signal amplitudes lie above both thresholds, Thus, signals appear at the output of the threshold circuits S1 and S2, which open the AND gate G2, but block the AND circuit G1. Thus, no signal is available at the output A1. This means that the sensing signal is fault-free. At the output A2 therefore a correct signal will appear, which signal is to be assigned to the stored and sensed information.

In the second case a sensing signal with negative amplitude appears at the input E2. According to FIG. 1 this corresponds to a sensed "1." Then the sensed signal amplitude lies below the threshold of both threshold circuits S1 and S2. Thus no signal appears at the output of the threshold circuit. The same holds true for the AND circuit G1. Therefore, the output A1 of the coupling circuit V shows that the evaluated sensing signal is not faulty, so that the state of the outlet A2—in this case a "1"—can be assigned to the sensed information.

In the third case a faulty sensing signal appears at the input E2; thus, a sensing signal is present having an amplitude between the thresholds of the threshold circuits S1 and S2. Then only the threshold circuit S2 reacts; the threshold circuit S1 remains blocked. The AND circuit G1 of the coupling circuit V is then permeable and supplies a signal to the output A1. The AND circuit G2 of the coupling circuit V remains blocked. The signal at the output A1 shows that a faulty signal has appeared at the evaluating circuit. The the state of the output A2 may be assigned to any information. The signal at the output A1 can be supplied to a correction circuit, which, using a redundant code, carries out the correction.

Thus always, if no signal appears at output A1, the sensed information is accepted at the output A2 of the evaluating circuit. If, however, the coupling circuit emits a signal at the output A1, then this means that a faulty case is at hand and the state of the output A2 may not be assigned to an information. The correct information is then detected by a correction circuit.

The assignment of logical magnitudes to the amplitude of the sensing signals, can, of course, also be the opposite of that illustrated in FIG. 1. Furthermore, it is possible, of course, to realize the evaluating circuit with other logical circuits than AND circuits.

An important advantage of the evaluating circuit according to this invention is that the sensing signals can be diminished as low as the admissible limit which is given by interference signals and amplifier noise. If the sensing signal then lies below this limit, the evaluating circuit recognizes this as a faulty signal and can cause the correction with the use of a redundant code.

Many changes and modifications of the invention will become apparent to those skilled in the art, and it is to be understood that I wish to include within the patent warranted hereon all such changes and modifications as may reasonably and properly be included within the scope of my contribution to the art.

What I claim as my invention is:

1. An evaluation circuit for determining valid and faulty information output signals from a memory during a sampling pulse, comprising: a pair of threshold circuit, each of said threshold circuits including an output, a first input for receiving memory output signals and a second input for receiving sampling pulses, each of said threshold circuits having a different threshold level, said threshold circuits operable in response to a sampling pulse and a memory output signal between said threshold levels to produce different output signals at their respective outputs and operable in response to a sampling pulse and a memory output signal outside of said threshold levels to provide the same output signals at their respective outputs; and a coupling circuit having first and second outputs and first and second inputs, said first and second inputs connected to each of said outputs of said threshold circuits, said coupling circuit operable in response to said same output signals of said threshold circuits to provide an output signal at said first output indicative of the information content of the sensed signal, and operable in response to said different output signals of said threshold circuits to provide an output signal on said second output indicative of a faulty memory output signal.

2. The evaluation circuit according to claim 1, wherein said coupling circuit comprises: a first AND circuit having two inputs connected to respective ones of said outputs of said threshold circuits and an output forming said first output of said coupling circuit; a second AND circuit having two inputs connected to respective ones of said outputs of said threshold circuits and an output forming said second output of said coupling circuit; and a negation element interposed in the connection between one of said inputs of said second AND circuit and said output of one of said threshold circuits.

* * * * *